(12) United States Patent
Piehl et al.

(10) Patent No.: US 8,418,962 B2
(45) Date of Patent: Apr. 16, 2013

(54) DISTRIBUTION OF POINT LOADS IN HONEYCOMB PANELS

(75) Inventors: Marc. J. Piehl, Renton, WA (US); Douglas A. Frisch, Renton, WA (US); Kirk B. Kajita, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 602 days.

(21) Appl. No.: 12/017,009

(22) Filed: Jan. 19, 2008

(65) Prior Publication Data
US 2009/0184204 A1  Jul. 23, 2009

(51) Int. Cl.
 *B64C 1/06* (2006.01)
(52) U.S. Cl.
 USPC ........................ 244/131; 244/123.13
(58) Field of Classification Search .......... 244/131, 244/117 R, 123.13, 119; 52/793.1, 787.1, 52/787.12; 411/82, 34; 428/593, 116
See application file for complete search history.

(56) References Cited

U.S. PATENT DOCUMENTS

| | | | | |
|---|---|---|---|---|
| 3,016,578 A * | 1/1962 | Rohe | ............... | 52/787.12 |
| 3,110,064 A * | 11/1963 | Koontz | ............... | 52/787.1 |
| 3,394,513 A * | 7/1968 | Nerem | ............... | 52/787.1 |
| 3,890,749 A * | 6/1975 | Gunther | ............... | 244/131 |
| 4,190,996 A * | 3/1980 | Schindler et al. | ......... | 244/131 |
| 4,273,818 A * | 6/1981 | Buchs | ............... | 52/787.12 |
| 4,719,727 A * | 1/1988 | Cooper et al. | ......... | 52/787.1 |
| 5,093,957 A * | 3/1992 | Do | ............... | 52/787.1 |
| 5,240,543 A * | 8/1993 | Fetterhoff et al. | ......... | 411/82 |
| 5,975,237 A * | 11/1999 | Welch et al. | ......... | 181/290 |
| 6,349,903 B2 | 2/2002 | Caton et al. | | |
| 6,656,299 B1 * | 12/2003 | Grosskrueger et al. | ......... | 156/66 |
| 6,824,851 B1 * | 11/2004 | Locher et al. | ......... | 156/250 |
| 2008/0008521 A1 * | 1/2008 | Naik et al. | ......... | 403/255 |

FOREIGN PATENT DOCUMENTS
EP  09 25 0096  4/2009

* cited by examiner

*Primary Examiner* — Christopher P Ellis
(74) *Attorney, Agent, or Firm* — Hanley, Flight & Zimmerman, LLC

(57) ABSTRACT

Composite panels used in aircraft are formed by a sandwich including a lightweight honeycomb core reinforced by a solid plank in medial regions of the panel. The plank is bonded to the honeycomb and forms an integral part of the core where a strut is attached to the panel. The plank distributes point loads imposed on the panel by the strut.

24 Claims, 7 Drawing Sheets

US 8,418,962 B2

DISTRIBUTION OF POINT LOADS IN HONEYCOMB PANELS

TECHNICAL FIELD

This disclosure generally relates to composite panels, especially those having honeycomb cores, and deals more particularly with a panel construction that is effective in distributing point loads, as well as a method for making the panels.

BACKGROUND

Aerodynamic features on aerospace vehicles may be formed by lightweight composite panels that are attached to the vehicle airframe. For example, aerodynamic pressure fairings are often formed from large, reinforced honeycomb panels that may be connected together and attached by struts to an airframe. In order to cover large spans, thicker and/or higher density panels are required in order to react loads across the span, however these thicker panels increase the weight of the aircraft.

The honeycomb panels described above may be attached to the airframe by composite laminates that are ramped down along the edges of the panel in order to allow attachment of the edges to the airframe by fasteners. However, ramping down the edges of the honeycomb panel to a solid laminate along the panel edges adds weight to the panel. Moreover, since the entire load on the panel is transferred to the edges, the ramped down laminate section must be thicker in order to carry the load, thereby further adding to vehicle weight.

Accordingly, there is a need for composite panels capable of distributing point loads, as well as a method of making the panels.

SUMMARY

Embodiments of the disclosure satisfy the need for lightweight, honeycomb panels capable of distributing point loads. Point loads applied to medial regions of the panel are distributed by a plank that is incorporated in the core and is bonded to or co-cured with a surrounding section of honeycomb. The increased strength and load distribution provided by the plank allows the panel to be at least partially supported by a strut connected between a supporting frame and medial regions of the panel.

According to one disclosed embodiment, a composite panel comprises a core, and laminated plies of composite material bonded to or co-cured with first and second sides of the core. The core includes a first section of honeycomb material and a second section of essentially solid, laminated material surrounded by and bonded to the first section. The solid material may include laminated plies of composite material, and the first and second sections may be bonded by a foam adhesive. The panel may further comprise means for attaching a support to the panel in the area of the section of solid material.

According to another disclosed embodiment, a composite panel for aerospace vehicles comprises: a first, essentially solid laminate core section for distributing point loads across the panel; a second core section bonded to the first core section and having a load bearing capacity less than the first core section; laminated plies of material covering the first and second core sections; and, a load transmitting link connected to the panel in the area of the first core section for supporting the panel. The first core section may include laminated plies of composite material, and the second section of the core may include honeycomb material. The first and second core sections include abutting sides adhesively bonded to each other. The laminated plies may include doubler plies overlying the first core section. The first core section may be located in a medial region of the panel and may be generally circular in shape. The composite panel may further comprise a third core section having a load bearing capacity less than the second core section.

In accordance with another disclosed embodiment, an airplane fairing comprises: at least one panel including inner and outer laminated plies of composite material and a core sandwiched between the inner and outer laminated plies, wherein the core includes a section of increased density located in a medial region of the panel. The section of increased density may include a solid laminate plank, and the core may further include a honeycomb section bonded to and surrounding the plank. The airplane fairing may further comprise a strut for supporting the panel and means for attaching the strut to the panel in the area of the plank.

According to a disclosed method embodiment, fabricating a composite panel for an aerospace vehicle comprises: making a plank; forming a core by positioning the plank within a layer of honeycomb and bonding the honeycomb layer to the plank; forming a layup by placing layers of composite material on opposite sides of the core; compacting the layup; and, curing the layup. The plank may be fabricated by laminating plies of fiber reinforced resin. Bonding the honeycomb layer to the plank may be performed by introducing an adhesive foam between the sides of the honeycomb layer and the sides of the plank. The method may further comprise installing a strut attachment on the panel in the area of the plank.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
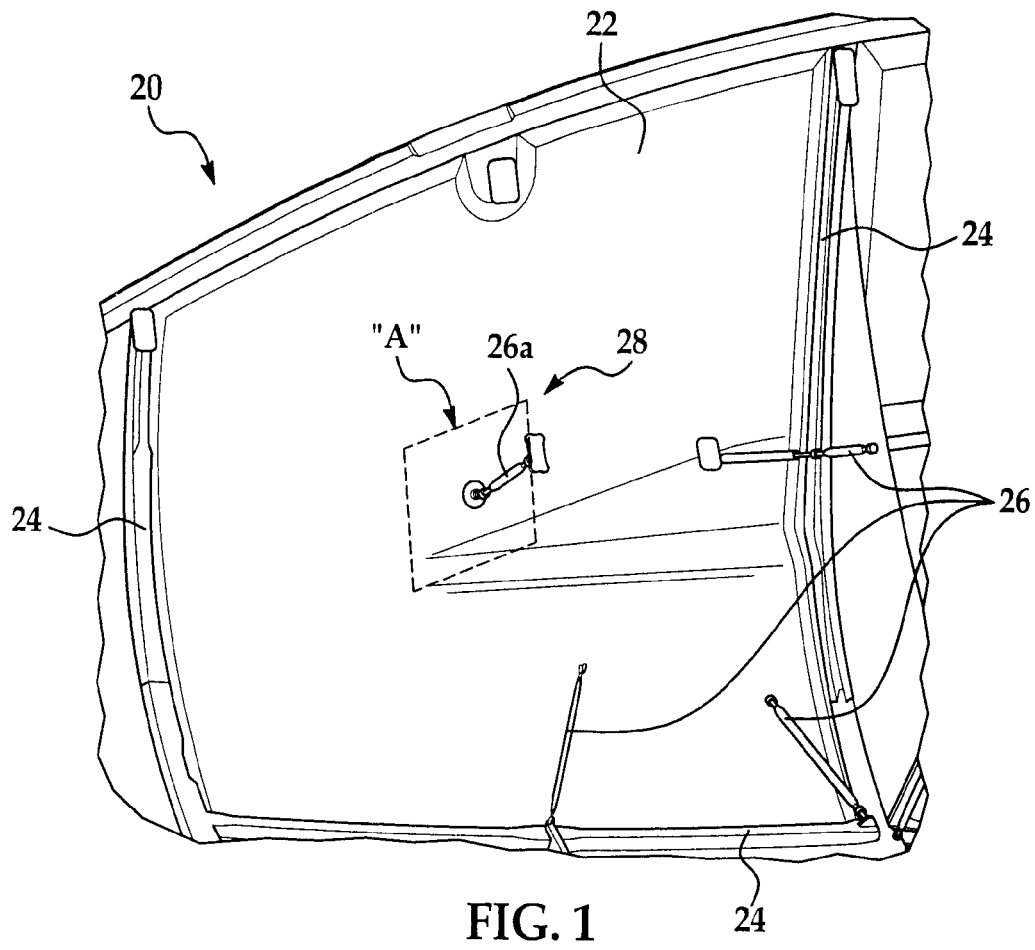
FIG. 1 is a perspective view of the inboard side of a portion of an airplane fairing, depicting a support strut attached to a medial region of a panel.
Figure 2:
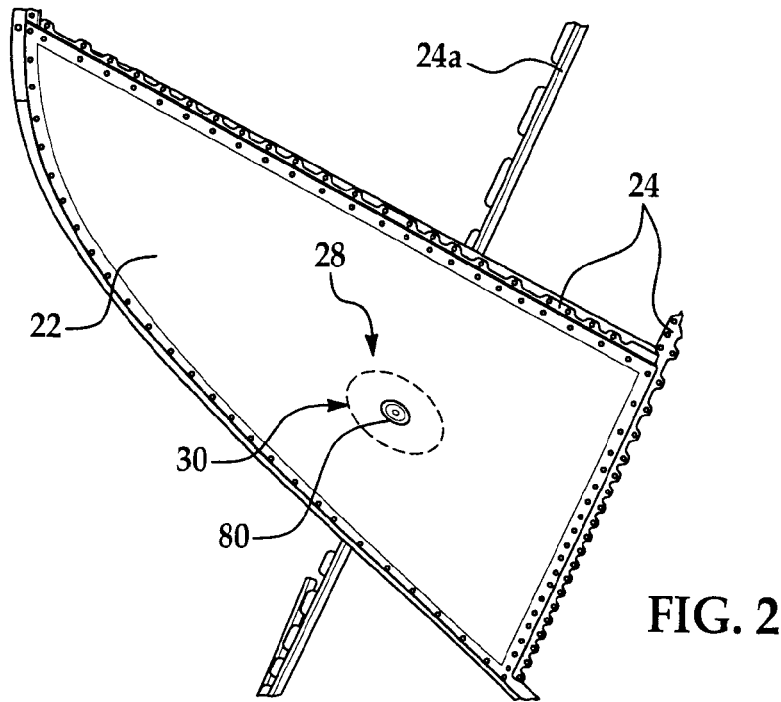
FIG. 2 is an elevation view of the outboard side of the fairing shown in FIG. 1.

Referring first to FIGS. 1-8, an aircraft fairing generally indicated by the numeral 20 may include one or more lightweight, composite panels 22 fastened along their peripheries to a supporting frame 24. The frame 24 may, in turn, be attached as by struts 26 to the aircraft's airframe (not shown). In accordance with the disclosed embodiments, medial regions 28 of the panel 22 are supported on the frame member 24a (FIGS. 2 and 3) by a strut-like, rigid link 26a. The attachment of the link 26a to the medial regions 28 of the panel 22 also results in less deflection or pillowing of the panel 22, which in turn reduces parasitic drag from the fairing 20, thereby improving fuel economy. As will be discussed below in more detail, the medial region 28 of the panel 22 is reinforced by a solid laminate plank 56 which functions to transfer pressure loads out of the panel 22 in order to provide moment continuity, and efficiently allow the link 26a to remove transverse shear loads from the panel 22.

Figure 3:
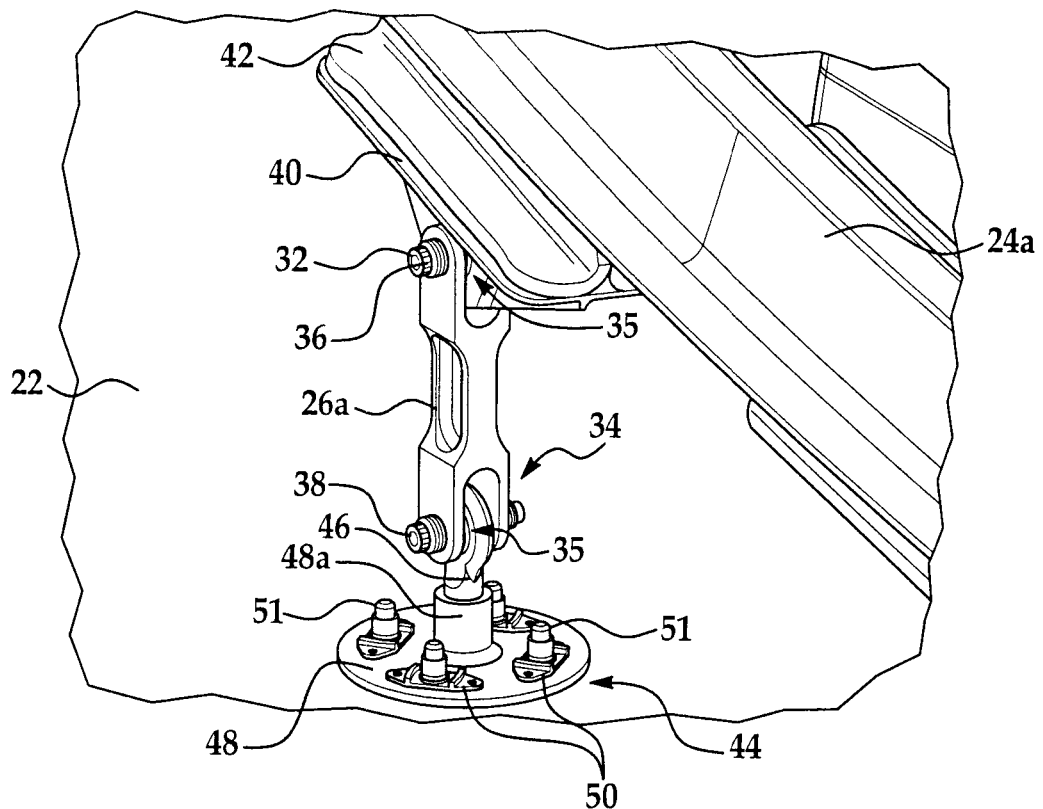
FIG. 3 is a perspective view showing details of the attachment of the strut between the panel and a frame member.
Figure 4:
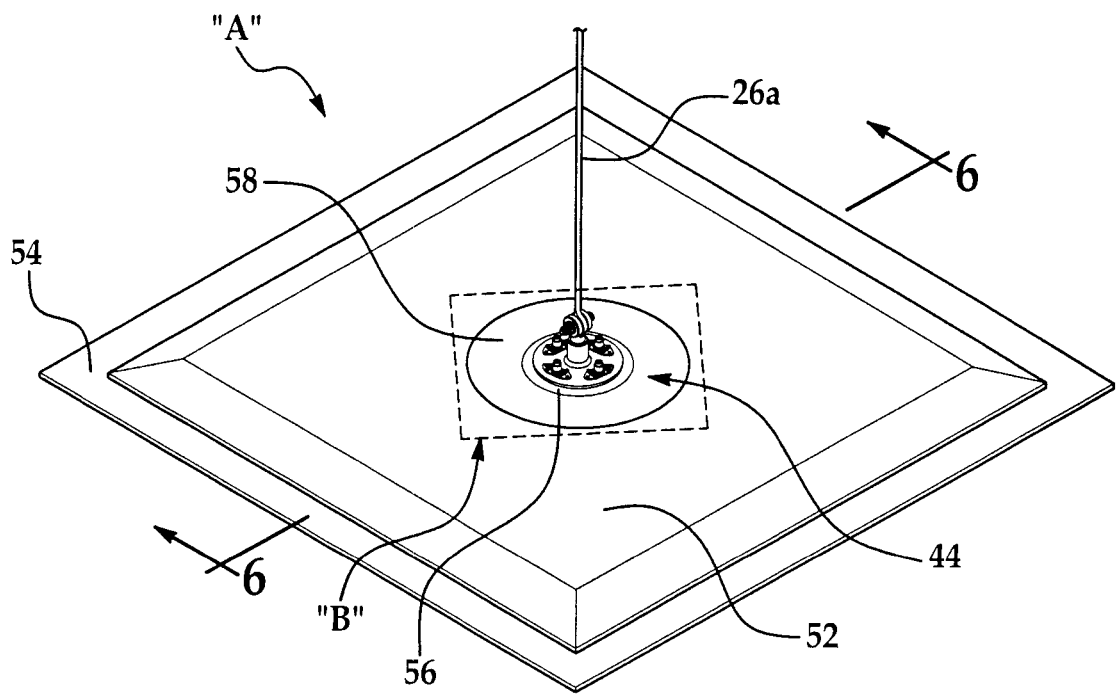
FIG. 4 is an enlarged view of the area indicated as "A" in FIG. 1.
Figure 5:
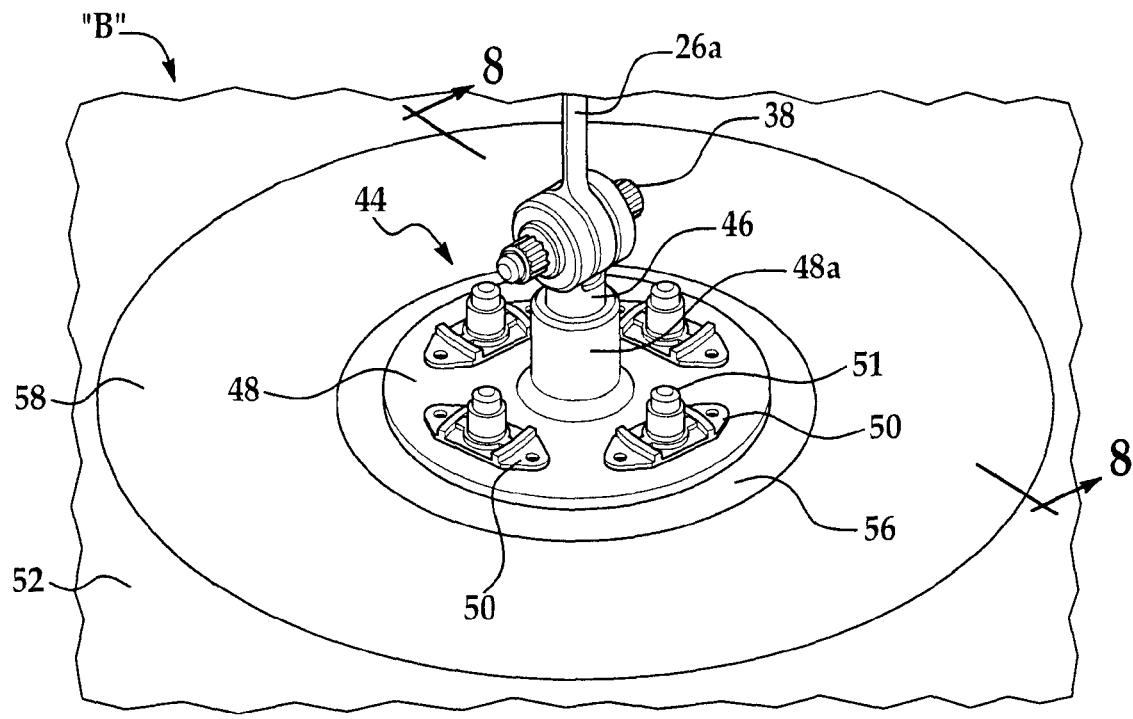
FIG. 5 is an enlarged view of the area designated as "B" in FIG. 4.
Figure 6:
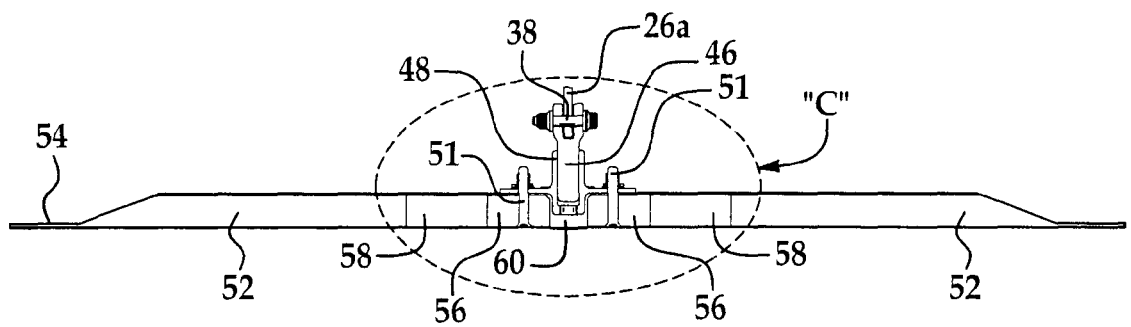
FIG. 6 is a sectional view taken along the line 6-6 in FIG. 4.
Figure 7:
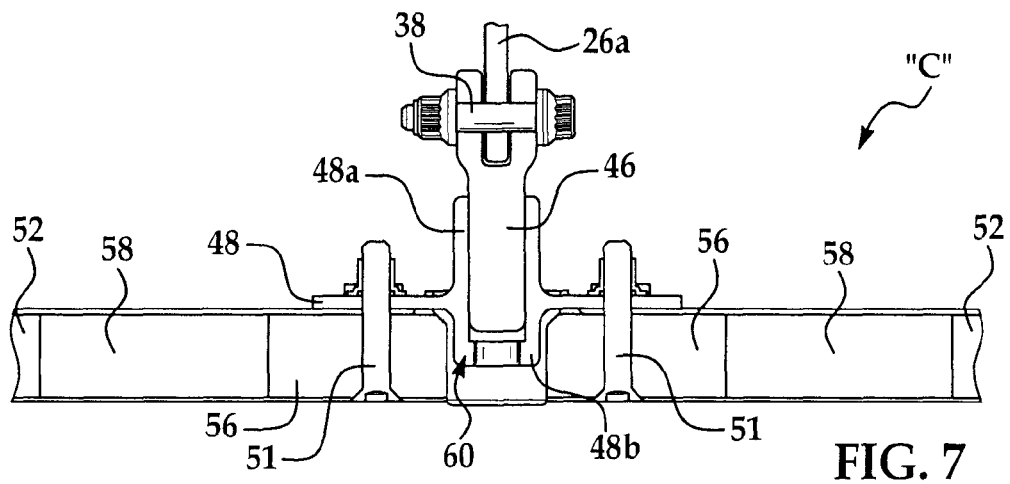
FIG. 7 is an enlarged view of the area designated as "C" in FIG. 6.

In one embodiment, shown in FIG. 3, the link 26a includes devises 32, 34 and pins 36, 38 at its opposite ends. Pins 36, 38 may pass through spherical bearings 35 which connect the link 26a between an attachment fitting 40 and a panel attachment assembly 44. The attachment fitting 40 may in turn be secured to the frame member 24a by an angle adaptor 42 which effectively adjusts the position of the axis of the pin 36 relative to the frame member 24a. The spherical bearings 35 allow the fairing 20 to move along multiple axes relative to the frame member 24a, thus allowing the fairing 20 to flex somewhat in response to airflow loads and fuselage motion.

The adjustable panel attachment fitting assembly 44 includes a nut plate 48 that is secured to the inboard face of the panel 22 by fastener bolts 51 which pass through the panel 22 and are held by threaded retainer nuts 50. A threaded eyebolt 46 is connected to the link 26a by the pin 38 and clevis 34, and is threadably received within a threaded, cylindrical body 48a forming part of the nut plate 48. As will be described in more detail below, removal of the bolts 51 allows the nut plate 48 to be rotated in either of two rotational directions, in order to adjust the axial position of the link 26a.

Referring now to FIGS. 9-14 the fastener bolts 51 pass through four through-holes 86 in the panel 22 which surround a central, countersunk through-hole 60. A sleeve 88, which may comprise, for example a corrosion resistant steel, is bonded or swaged within the central through-hole 60. The lower end 48b of the cylinder 48a passes through the sleeve 88 and includes a key-like opening 48c that is adapted to receive the end of a tool 90. When the fastener bolts 51 have been removed, rotation of the tool 90 likewise results in the rotation of the nut plate 48, thereby axially displacing the eyebolt 46 as well as the link 26a. Rotation of the nut plate 48 allows a shimless installation and fastener alignment. Since the nut plate 48 is threadably held on the end of the eyebolt 46, the nut plate 48 remains fastened to the link 26a when the fairing 20 is removed for servicing or other purposes. The use of the panel attachment fitting assembly 44 allows the fairing panel 20 to be removed and reinstalled without requiring access to the inside of the fairing 20.

In order to protectively enclose the through-hole 60 as well as the fastener bolts 86, a circular cover 90 is provided, which may be formed of a flexible, but durable material such as nylon. The cover 90 includes a tubular portion 92 that is received within sleeve 88. A retainer bolt 92, which also may comprise a nylon material, passes through the center of the cover 90 into the key-like opening 48c in order to hold the cover 90 against the outer surface of the panel 22.

In accordance with the disclosed embodiments, point loads imposed on the panel 22 resulting from the attachment of the link 26a to medial regions 28 are laterally distributed through at least a portion of the panel 22. The medial regions 28 of the panel 22 are effectively reinforced by the plank 56 which forms part of the core 62 of the panel 22. The plank 56 may comprise, for example, a solid, rigid material formed by laminated plies of a composite material such as fiber reinforced resin, i.e., a solid laminate. The use of a plank 56 formed from a solid laminate allows the panel 22 to carry higher out-of-plane shear loads and bending loads compared to other types of core constructions. In the illustrated example, the plank 56 is circular in shape and is slightly larger in diameter than the diameter of the nut plate 48. Other geometries, however, are possible, although a circular geometry aids in uniformly transferring moments in any radial direction through the plane of the panel 22.

The solid plank 56 is effectively embedded in, and forms an integral part of the honeycomb panel core 62, enabling the link 26a or similar strut/tie-rod to be directly attached to the middle of the panel 22 while remaining capable of reacting large out-of-plane loads. The nut plate 48 can be directly attached to the plank 56 and then adjusted to fit against the panel 22 from outside of the fairing 20 using the adjustable panel attachment fitting 44. The plank 56 may be either pre-cured or uncured (green) when it is inserted into the honeycomb panel core 62. The plank 56 is then co-cured with or co-bonded to the honeycomb core assembly 62 during fabrication of the panel 22.

The core 62 further includes a ring shaped honeycomb section 58 surrounding and attached to the sides of the plank 56. The ring shaped honeycomb section 58 is surrounded by another honeycomb section 52. In one embodiment, the density of the core section 58 is less than that of the plank 56 but greater than the density of the core section 52. For example, in one application providing satisfactory results, the plank 56 comprises 60 laminated plies of fiberglass, core section 58 comprises a heat resistant phenolic honeycomb having a density of eight pounds per cubic foot, and core section 52 is also a heat resistant phenolic honeycomb having a density of three pounds per cubic foot. Where the plank 52 is green (uncured) during the assembly phase, the honeycomb core section 58 may be attached by co-curing plank 56 and core section 52 using a suitable foam adhesive which forms a splice 84 (see FIG. 8).

Figure 8:
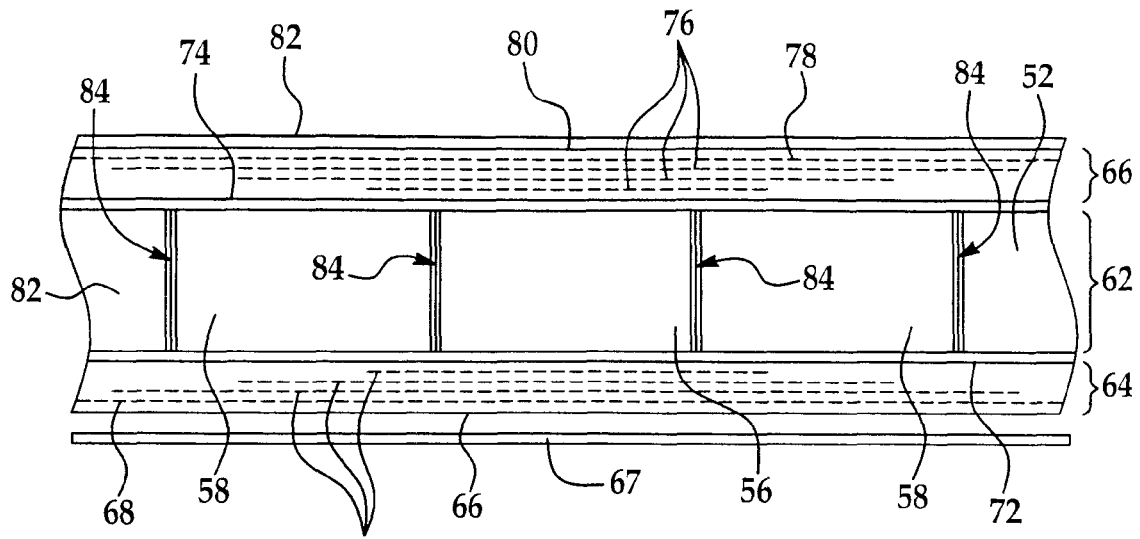
FIG. 8 is a diagrammatic, sectional view showing a layup used for forming the composite panel.
Figure 9:
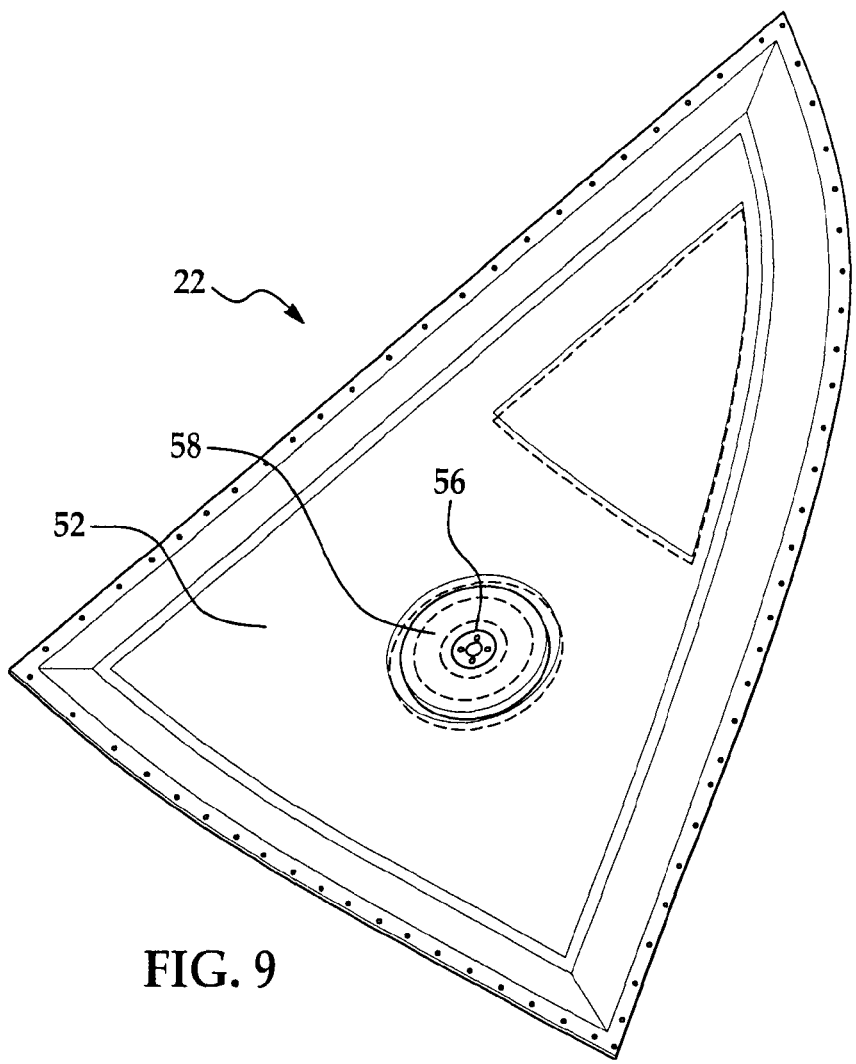
FIG. 9 is a perspective view of the panel before the strut has been attached.
Figure 10:
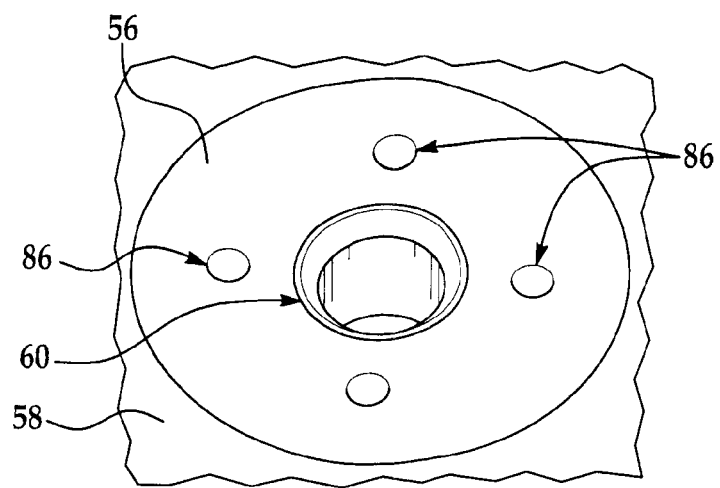
FIG. 10 is an enlarged view showing the formation of mounting holes in the panel illustrated in FIG. 9.
Figure 11:
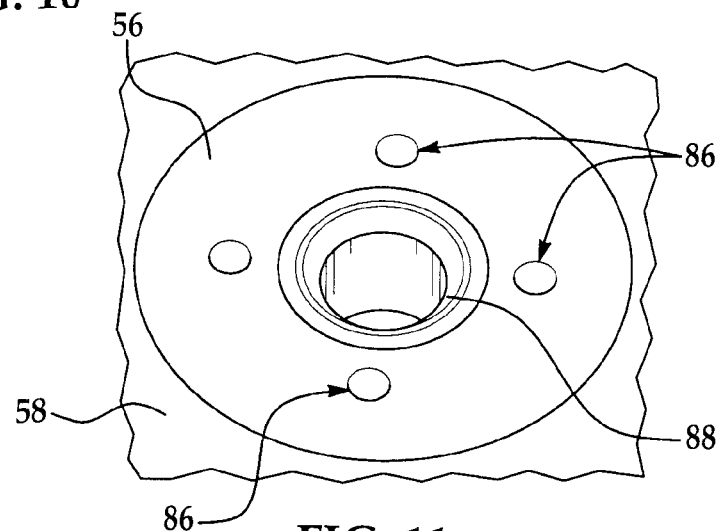
FIG. 11 is a view similar to FIG. 10 but showing the installation of a sleeve in the center hole.
Figure 12:
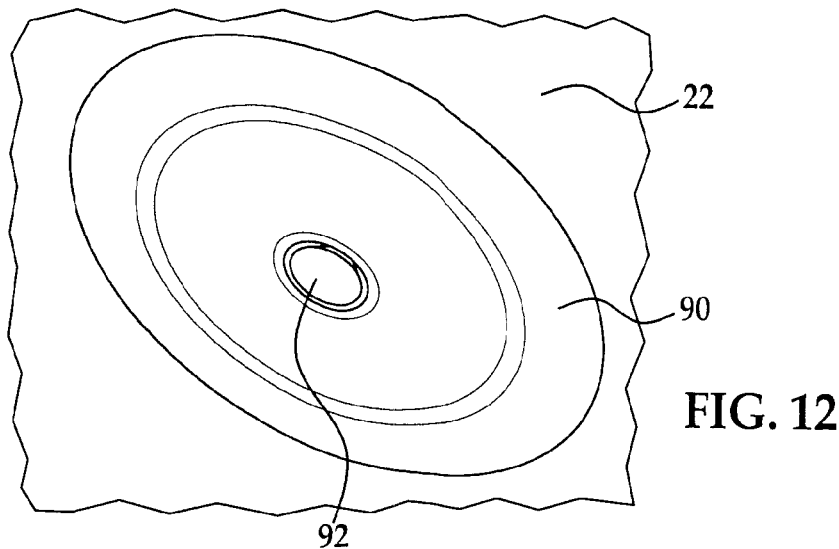
FIG. 12 is a perspective view showing the front of a cover installed over the outboard side of the center hole.
Figure 13:
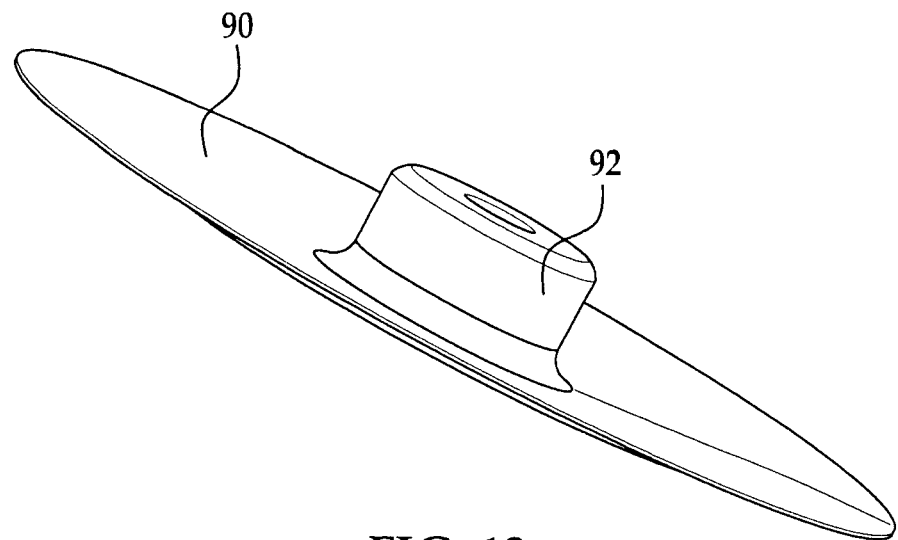
FIG. 13 is a perspective view showing the rear side of the cover shown in FIG. 12.
Figure 14:
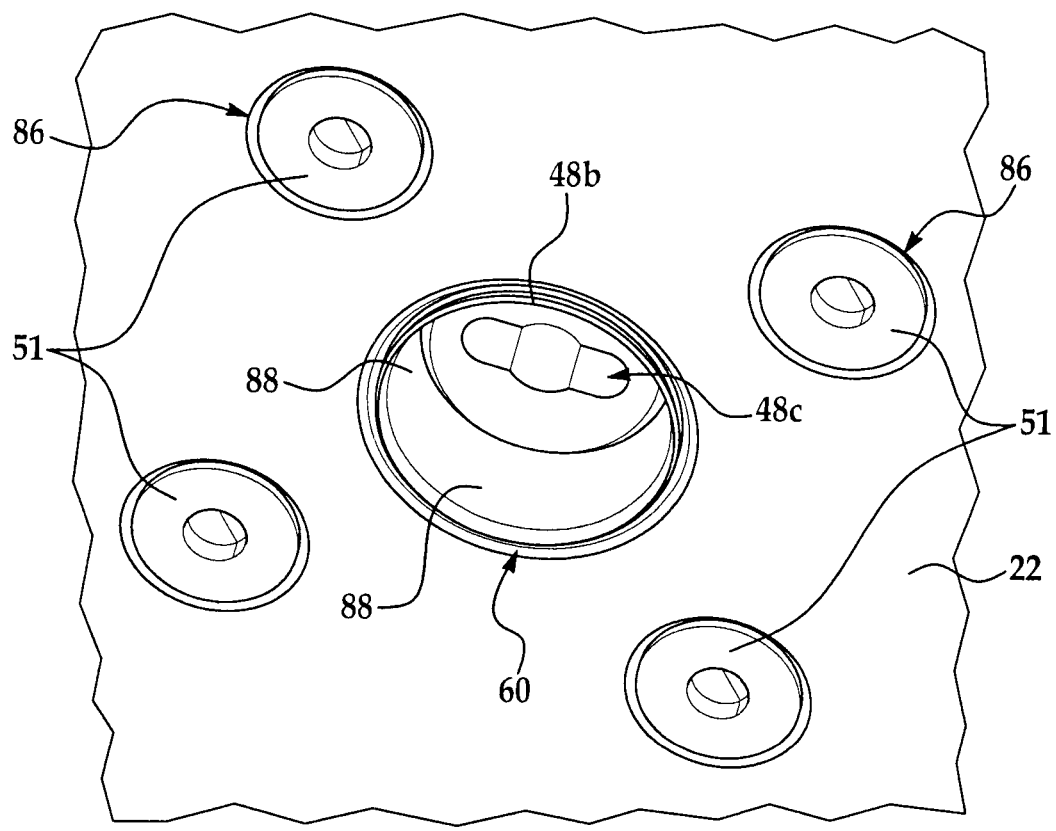
FIG. 14 is an enlarged view of the outer surface of the panel, and showing strut attachment fasteners and a position adjuster accessed from outside the panel.
Figure 15:
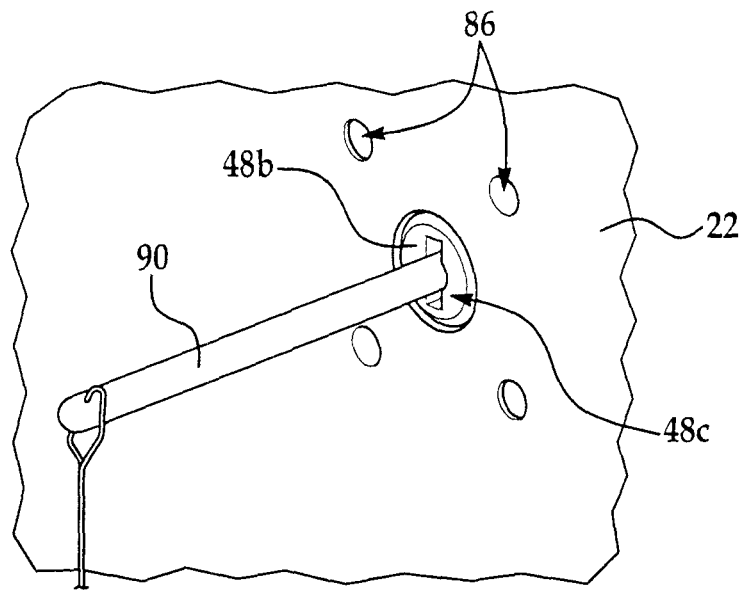
FIG. 15 is a perspective view showing a tool having been inserted into the position adjuster from outside the panel.

FIG. 8 shows additional details of the layers that form the reinforced area 52 on the outer skin 54 of the panel 22. The core 62 formed by the co-bonded or co-cured plank 56 and honeycomb sections 52, 58 are sandwiched between laminated plies 64, 66 which may comprise any of various fiber reinforced resins, such as fiberglass. The laminated plies 64 may include multiple drop-off plies 70 sandwiched between full plies 68, 72. Similarly, the outer group of laminated plies 66 may include drop-off plies 76 sandwiched between full plies 74, 78. The drop-off plies 70-76 in the region overlying the plank 56 and the high density honeycomb section 58 are intended to reinforce the medial regions 28 of the panel 22 where the link 26a is attached to the panel 22. A surfacer 66 may be applied to the outboard side of the panel 22, covering the laminated plies 64 in order to achieve a desired smoothness.

Figure 16:
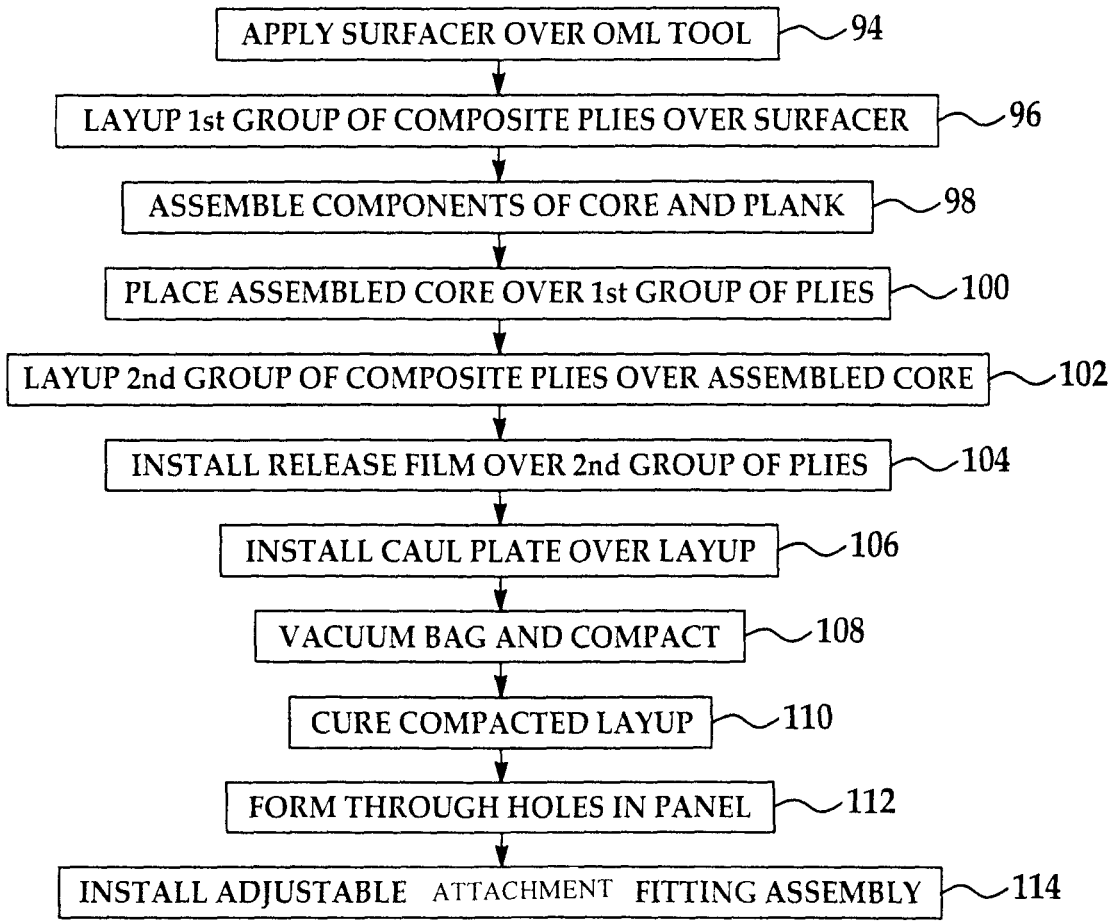
FIG. 16 is a flow diagram illustrating the steps of a method for making the panel.

Referring now simultaneously to FIGS. 8 and 16, the panel 22 may be fabricated beginning at step 94 where a suitable surfacer 66 is placed over an outer mold line (OML) tool 67. Next, at step 96, the composite plies forming the first ply group 64 are successively stacked on the surfacer 66. Then, at 98, the core 62 is assembled together with the plank 56 and honeycomb sections 52, 58 using a foaming adhesive as previously described. The plank 56 may be either cured or uncured at this stage of the fabrication process.

Assembly of the core 62 in step 98 may be carried out by forming a first cut-out in honeycomb section 52 having the size and shape of honeycomb section 58, placing section 58 in the cut-out and then bonding the sides of section 52 to the sides of section 58. Similarly, a second cut-out is formed in the honeycomb section 58 that matches the size and shape of the plank 56, following which the plank 56 is placed within the cut-out in section 58. Then, the sides of the plank 56 are attached to the sides of the honeycomb section 58 using a foaming adhesive to complete assembly of the core 62. At step 100, the assembled core 62 is placed on top of the first group of plies 64.

At step 102, the plies in the second group 66 are successively laid up over the assembled core 62. Then, at 104, a suitable release film 80, such as TEDLAR® is placed over the ply group 66. Next, at 106, a caul plate 82 is placed on top of the layup. At 108, the layup is vacuum bagged and compacted, following which the compacted layup and core are co-cured cured at step 110. Then, the through-holes 60, 86 are formed in the panel as shown at 112, following which at step 114, the adjustable panel attachment fitting assembly 44 is secured to the panel 22.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A core for use in a composite panel, comprising:
    a first section including honeycomb material and a second section surrounded by the first section, the first section of honeycomb material having a first density less than a second density of the second section; and
    a third section including honeycomb material having a material characteristic different than the honeycomb material of the first section, wherein the first section is surrounded by the third section; wherein said core further comprises a strut attachment on the composite panel in an area of the second section to provide movement along multiple axes to provide for flexing in response to loads and motion.

2. The core of claim 1, further comprising the composite panel and wherein the first section is bonded to the second section by a foam adhesive.

3. The core of claim 1, wherein laminated plies are coupled to first and second sides of the composite panel covering a solid plank of the second section.

4. The core of claim 1, further comprising an attachment location to receive a support to the composite panel in an area of the second section of the core.

5. A composite panel for aerospace vehicles, comprising:
    a first core section for distributing point loads across the panel;
    a second core section formed with and bonded to the first core section and having a load bearing capacity less than the first core section; and
    a load transmitting link coupled to the panel in an area of the first core section for supporting the panel and to provide movement along multiple axes to provide for flexing in response to loads and motion.

6. The composite panel of claim 5, wherein:
    the first core section includes laminated plies of composite material, and
    the second core section includes honeycomb material.

7. The composite panel of claim 6, wherein the first and second core sections include abutting sides adhesively bonded to each other.

8. The composite panel of claim 5, further comprising laminated plies having doubler plies overlying the first core section.

9. The composite panel of claim 5, wherein the first core section is located in a medial region of the panel.

10. The composite panel of claim 5, wherein the first core section is circular in shape.

11. The composite panel of claim 5, wherein the first core section includes laminated plies of glass fiber reinforced resin.

12. The composite panel of claim 5, wherein the entire periphery of the first core section is surrounded by and bonded to the second core section.

13. The composite panel of claim 5, further comprising a third core section surrounding the second core section and having a load bearing capacity less than the second core section.

14. The composite panel of claim 5, further comprising attachment means passing through the first core section for attaching the link to the panel.

15. An airplane fairing, comprising:
    at least one panel including inner and outer laminated plies of composite material and a core sandwiched between the inner and outer laminated plies, the core including a first section of increased density relative to a second section, the first section to be integrally formed with and located in a medial region of the panel; and
    a strut attachment on the at least one panel in an area of the first section to provide movement along multiple axes and for flexing in response to loads and motion.

16. The airplane fairing of claim 15, wherein:
    the first section of increased density includes a solid plank, and
    the core further includes a honeycomb section bonded to and surrounding the plank.

17. The airplane fairing of claim 15, further comprising:
    a strut for supporting the panel and
    means for attaching the strut to the panel in an area of the first core section having increased density.

18. The airplane fairing of claim 15, wherein:
    the first section of increased density includes laminated plies of composite material forming an essentially solid member, and
    the second core section comprises a honeycomb material that surrounds the solid member, the honeycomb section including first portion having a first density and bonded to the solid member, and a second portion having a second density less than the first density, the second portion surrounding and bonded to the first portion.

19. A method of fabricating a composite panel for an aerospace vehicle, comprising:
    making a plank;

forming a core by positioning the plank in a honeycomb layer and bonding the honeycomb layer to the plank;

forming a layup by placing layers of composite material on opposite sides of the core;

attaching a strut to the composite panel in an area of the plank to provide panel movement along multiple axes;

compacting the layup; and, curing the layup.

20. The method of claim 19, wherein making the plank includes laminating plies of fiber reinforced resin.

21. The method of claim 19, wherein bonding the honeycomb layer to the plank includes introducing an adhesive foam between sides of the honeycomb layer and sides of the plank.

22. The method of claim 19, further comprising:

installing a strut attachment on the panel in a medial region of the panel.

23. The method of claim 19, wherein positioning the plank in the honeycomb layer includes:

forming a cut-out in the honeycomb layer to receive the shape of the plank, and placing the plank in the cut-out, and bonding sides of the plank to sides of the honeycomb layer.

24. The core of claim 1, wherein the material characteristic comprises a density, and wherein the honeycomb material of the third section has a third density less than the first density of the first section of honeycomb material.

\* \* \* \* \*